US009195842B2

(12) United States Patent
Zang et al.

(10) Patent No.: US 9,195,842 B2
(45) Date of Patent: Nov. 24, 2015

(54) INFORMATION PROCESSING METHOD, APPARATUS, AND SYSTEM

(71) Applicant: Huawei Technologies Co., Ltd., Shenzhen, Guangdong (CN)

(72) Inventors: Wenyang Zang, Beijing (CN); Yibo Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/317,182

(22) Filed: Jun. 27, 2014

(65) Prior Publication Data

US 2015/0007336 A1    Jan. 1, 2015

(30) Foreign Application Priority Data

Jun. 27, 2013 (CN) .......................... 2013 1 0263145

(51) Int. Cl.
| | |
|---|---|
| *G06F 17/30* | (2006.01) |
| *G06F 21/62* | (2013.01) |
| *H04L 12/58* | (2006.01) |
| *G06Q 10/10* | (2012.01) |
| *H04L 29/06* | (2006.01) |

(52) U.S. Cl.
CPC .............. *G06F 21/62* (2013.01); *G06Q 10/107* (2013.01); *H04L 51/12* (2013.01); *H04L 51/14* (2013.01); *H04L 63/0245* (2013.01); *H04L 63/105* (2013.01); *G06F 2221/2113* (2013.01)

(58) Field of Classification Search
None
See application file for complete search history.

(56) References Cited

U.S. PATENT DOCUMENTS

| | | |
|---|---|---|
| 6,769,067 B1 | 7/2004 | Soong |
| 2002/0087479 A1 | 7/2002 | Malcolm |
| 2011/0072034 A1 | 3/2011 | Sly et al. |
| 2011/0143776 A1 | 6/2011 | Shankaranarayanan et al. |
| 2012/0011361 A1 | 1/2012 | Guerrero et al. |
| 2012/0083287 A1 | 4/2012 | Casto et al. |
| 2012/0166180 A1 | 6/2012 | Au |
| 2013/0060863 A1 | 3/2013 | D'Eri et al. |

FOREIGN PATENT DOCUMENTS

| | | |
|---|---|---|
| CN | 101984686 A | 3/2011 |
| CN | 102289431 A | 12/2011 |

*Primary Examiner* — Syed Hasan
(74) *Attorney, Agent, or Firm* — Leydig, Voit & Mayer, Ltd.

(57) ABSTRACT

The present invention relates to an information processing method, apparatus, and system. The method includes: receiving text information; performing calculation on the text information by using a first model to obtain a public sensitivity weight value corresponding to the text information; determining whether the public sensitivity weight value is greater than a first preset threshold; and if yes, displaying first processing prompt information indicating that the text information includes sensitive information; if no, performing calculation on the text information by using a second model to obtain an individual sensitivity weight value corresponding to the text information; and determining whether the individual sensitivity weight value is greater than a second preset threshold; and if yes, displaying second processing prompt information indicating that the text information includes sensitive information. The present invention enables a terminal to automatically detect whether text information involves sensitive information, thereby improving security of a crowdsourcing application.

15 Claims, 2 Drawing Sheets

INFORMATION PROCESSING METHOD, APPARATUS, AND SYSTEM

CROSS-REFERENCE TO RELATED APPLICATIONS

This application claims priority to Chinese Patent Application No. 201310263145.6, filed on Jun. 27, 2013, which is hereby incorporated by reference in its entirety.

TECHNICAL FIELD

The present invention relates to the information processing field, and in particular, to an information processing method, apparatus, and system.

BACKGROUND

A crowdsourcing technology is a technology in which a company or an institution outsources a work task performed in the past by employees to an undefined (usually a large) public network in the form of an open call. With the development of the crowdsourcing technology, an application scope of crowdsourcing also becomes wider. For example, crowdsourcing products, such as Wikipedia and Baidu Encyclopedia, are becoming popular. While the crowdsourcing technology develops rapidly, a problem that information of a crowdsourcing user is likely to be leaked occurs.

In the prior art, when submitting a task to a network server, a crowdsourcing user usually publishes the task in an anonymous manner to prevent user information from being stolen, where a network server side ensures privacy security of the user. However, an existing crowdsourcing application has the following disadvantages: when the user submits the task to the network server side, it cannot be ensured that the task is not intercepted or tampered by an unauthorized user during transmission; and it is possible that the user may, because of a misoperation, send sensitive information to the network server side, and the network server side may leak the sensitive information of the user.

SUMMARY

Embodiments of the present invention provide an information processing method, apparatus, and system, so as to enable a terminal to automatically detect, when receiving text information, whether text information involves sensitive information and to reply securely to the text information involving the sensitive information, thereby improving security of a crowdsourcing application.

According to a first aspect, an embodiment of the present invention provides an information processing method, where the method includes:

receiving text information;

performing calculation on the text information by using a first model to obtain a public sensitivity weight value corresponding to the text information, where the first model is constructed and obtained according to a public model parameter sent by a network server;

determining whether the public sensitivity weight value is greater than a first preset threshold; and if yes, displaying first processing prompt information indicating that the text information includes sensitive information, and replying to the text information according to a received processing instruction corresponding to the first processing prompt information; if no, performing calculation on the text information by using a second model to obtain an individual sensitivity weight value corresponding to the text information, where the second model is constructed and obtained according to user history behavior information and an individual model parameter that is sent by the network server; and determining whether the individual sensitivity weight value is greater than a second preset threshold; and if yes, displaying second processing prompt information indicating that the text information includes sensitive information, and replying to the text information according to a received processing instruction corresponding to the second processing prompt information.

In a first possible implementation manner, after the determining whether the individual sensitivity weight value is greater than a second preset threshold, the method further includes: if the individual sensitivity weight value is not greater than the second preset threshold, displaying third processing prompt information indicating that the text information includes no sensitive information, and replying to the text information according to a received processing instruction corresponding to the third processing prompt information.

With reference to the first aspect, in a second possible implementation manner, the performing calculation on the text information by using a first model to obtain a public sensitivity weight value corresponding to the text information specifically includes: calculating a sensitivity weight corresponding to content of the text information and a sensitivity weight corresponding to a source of the text information by using the first model, where the sensitivity weight corresponding to the content of the text information is calculated and obtained according to a sensitivity weight corresponding to a publicly sensitive word in the text information; and calculating the public sensitivity weight value corresponding to the text information according to the sensitivity weight corresponding to the content of the text information and the sensitivity weight corresponding to the source of the text information which are calculated by using the first model.

With reference to the first aspect, in a third possible implementation manner, the user history behavior information includes one or a combination of any of the following items: content of history text information, a source of the history text information, content of history reply text information, a time difference between performing an operation of receiving the history text information and performing an operation of replying to the history text information, and a content input rate of the history reply text information; and the second model is specifically obtained by using the following steps: collecting the user history behavior information; and analyzing and training the user history behavior information, and obtaining an individually sensitive word and a sensitivity weight corresponding to the individually sensitive word according to a training result and the individual model parameter that is sent by the network server, so as to obtain the second model.

With reference to the third possible implementation manner of the first aspect, in a fourth possible implementation manner, the performing calculation on the text information by using a second model to obtain an individual sensitivity weight value corresponding to the text information specifically includes: calculating a sensitivity weight corresponding to content of the text information and a sensitivity weight corresponding to a source of the text information by using the second model, where the sensitivity weight corresponding to the content of the text information is calculated and obtained according to the sensitivity weight corresponding to the individually sensitive word in the text information; and calculating the individual sensitivity weight value corresponding to the text information according to the sensitivity weight corresponding to the content of the text information and the sensitivity weight corresponding to the source of the text information which are calculated by using the second model.

According to a second aspect, an embodiment of the present invention provides an information processing apparatus, where the apparatus includes:

a receiving unit, configured to receive text information, and transmit the text information to a public sensitivity weight value calculating unit;

the public sensitivity weight value calculating unit, configured to receive the text information transmitted by the receiving unit; perform calculation on the text information by using a first model to obtain a public sensitivity weight value corresponding to the text information, where the first model is constructed and obtained according to a public model parameter sent by a network server; and transmit the public sensitivity weight value to a processing unit;

the processing unit, configured to receive the public sensitivity weight value transmitted by the public sensitivity weight value calculating unit; determine whether the public sensitivity weight value is greater than a first preset threshold; and if yes, display first processing prompt information indicating that the text information includes sensitive information, and reply to the text information according to a received processing instruction corresponding to the first processing prompt information; and if no, perform calculation on the text information by using a second model to obtain an individual sensitivity weight value corresponding to the text information, where the second model is constructed and obtained according to user history behavior information and an individual model parameter that is sent by the network server, and transmit the individual sensitivity weight value to a replying unit; and the replying unit, configured to receive the individual sensitivity weight value transmitted by the processing unit; determine whether the individual sensitivity weight value is greater than a second preset threshold; and if yes, display second processing prompt information indicating that the text information includes sensitive information, and reply to the text information according to a received processing instruction corresponding to the second processing prompt information.

In a first possible implementation manner, the replying unit is further configured to: if the individual sensitivity weight value is not greater than the second preset threshold, display third processing prompt information indicating that the text information includes no sensitive information, and reply to the text information according to a received processing instruction corresponding to the third processing prompt information.

With reference to the second aspect, in a second possible implementation manner, the public sensitivity weight value calculating unit is specifically configured to: calculate a sensitivity weight corresponding to content of the text information and a sensitivity weight corresponding to a source of the text information by using the first model, where the sensitivity weight corresponding to the content of the text information is calculated and obtained according to a sensitivity weight corresponding to a publicly sensitive word in the text information; and calculate the public sensitivity weight value corresponding to the text information according to the sensitivity weight corresponding to the sensitivity weight corresponding to the content of the text information and the sensitivity weight corresponding to the source of the text information which are calculated by using the first model.

With reference to the second aspect, in a third possible implementation manner, the user history behavior information includes one or a combination of any of the following items: content of history text information, a source of the history text information, content of history reply text information, a time difference between performing an operation of receiving the history text information and performing an operation of replying to the history text information, and a content input rate of the history reply text information; and the apparatus further includes a collecting unit and a model generating unit, where the collecting unit is configured to collect the user history behavior information, and transmit the user history behavior information to the model generating unit; and the model generating unit is configured to receive the user history behavior information transmitted by the collecting unit, analyze and train the user history behavior information, and obtain an individually sensitive word and a sensitivity weight corresponding to the individually sensitive word according to a training result and the individual model parameter that is sent by the network server, so as to obtain the second model.

With reference to the third possible implementation manner of the second aspect, in a fourth possible implementation manner, the processing unit is specifically configured to: calculate a sensitivity weight corresponding to content of the text information and a sensitivity weight corresponding to a source of the text information by using the second model, where the sensitivity weight corresponding to the content of the text information is calculated and obtained according to the sensitivity weight corresponding to the individually sensitive word in the text information; and calculate the individual sensitivity weight value corresponding to the text information according to the sensitivity weight corresponding to the content of the text information and the sensitivity weight corresponding to the source of the text information which are calculated by using the second model.

According to a third aspect, an embodiment of the present invention provides an information processing system, including a terminal and a network server, where:

the network server transmits a public model parameter and an individual model parameter to the terminal;

the terminal constructs and obtains a first model according to the received public model parameter, and constructs and obtains a second model according to the individual model parameter and user history behavior information; and the terminal, after receiving text information, performs the following operations:

performing calculation on the text information by using the first model to obtain a public sensitivity weight value corresponding to the text information;

determining whether the public sensitivity weight value is greater than a first preset threshold; and if yes, displaying first processing prompt information indicating that the text information includes sensitive information, and replying to the text information according to a received processing instruction corresponding to the first processing prompt information; if no, performing calculation on the text information by using the second model to obtain an individual sensitivity weight value corresponding to the text information; and determining whether the individual sensitivity weight value is greater than a second preset threshold; and if yes, displaying second processing prompt information indicating that the text information includes sensitive information, and replying to the text information according to a received processing instruction corresponding to the second processing prompt information.

In a first possible implementation manner, after performing an operation of determining whether the individual sensitivity weight value is greater than the second preset threshold, the terminal, if it is determined that the individual sensitivity weight value is not greater than the second preset threshold, displays third processing prompt information indicating that the text information includes no sensitive information, and replies to the text information according to a received processing instruction corresponding to the third processing prompt information.

With reference to the third aspect, in a second possible implementation manner, a process in which the terminal performs calculation on the text information by using the first model to obtain the public sensitivity weight value corresponding to the text information is specifically as follows: calculating a sensitivity weight corresponding to content of the text information and a sensitivity weight corresponding to a source of the text information by using the first model, where the sensitivity weight corresponding to the content of the text information is calculated and obtained according to a sensitivity weight corresponding to a publicly sensitive word in the text information; and calculating the public sensitivity weight value corresponding to the text information according to the sensitivity weight corresponding to the content of the text information and the sensitivity weight corresponding to the source of the text information which are calculated by using the first model.

With reference to the third aspect, in a third possible implementation manner, the user history behavior information includes one or a combination of any of the following items: content of history text information, a source of the history text information, content of history reply text information, a time difference between performing an operation of receiving the history text information and performing an operation of replying to the history text information, and a content input rate of the history reply text information; and a process in which the terminal constructs and obtains the second model according to the individual model parameter and the user history behavior information is specifically as follows: collecting the user history behavior information; and analyzing and training the user history behavior information, and obtaining an individually sensitive word and a sensitivity weight corresponding to the individually sensitive word according to a training result and the individual model parameter that is sent by the network server, so as to obtain the second model.

With reference to the third possible implementation manner of the third aspect, in a fourth possible implementation manner, a process in which the terminal performs calculation on the text information by using the second model to obtain the individual sensitivity weight value corresponding to the text information is specifically as follows: calculating a sensitivity weight corresponding to content of the text information and a sensitivity weight corresponding to a source of the text information by using the second model, where the sensitivity weight corresponding to the content of the text information is calculated and obtained according to the sensitivity weight corresponding to the individually sensitive word in the text information; and calculating the individual sensitivity weight value corresponding to the text information according to the sensitivity weight corresponding to the content of the text information and the sensitivity weight corresponding to the source of the text information which are calculated by using the second model.

In the embodiments of the present invention, a terminal may, after receiving text information, first determine whether the text information involves publicly sensitive information by using a first model; if yes, display first processing prompt information to prompt a user to reply accordingly; if no, proceed to determine whether the text information involves individually sensitive information by using a second model; and if yes, display second processing prompt information to prompt the user to reply accordingly. Therefore, the embodiments of the present invention enables the terminal to automatically determine, when receiving the text information, whether the text information includes sensitive information; and if sensitive information is included, prompts the user that the text information includes the sensitive information, so that the user replies securely to the text information, thereby improving security of a crowdsourcing application.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The technical solutions of the present invention are further described below in detail with reference to accompanying drawings and embodiments.

In an actual application of the information processing method, apparatus, and system provided by embodiments of the present invention, as a good information processing method, the information processing method is applicable to a social media-type text crowdsourcing application, such as short message service (SMS) message crowdsourcing, WeChat crowdsourcing, or microblog crowdsourcing. A terminal may, when receiving a piece of text information, first perform security detection on the text information to determine whether the text information includes sensitive information, that is, involves privacy information of a user; if the sensitive information is included, display processing prompt information indicating that the text information includes the sensitive information on an interface of the terminal, where the processing prompt information may be prompt information for highlighting a button position for individual reply, graying a button position for crowdsourcing reply, disabling an operation of crowdsourcing reply, or the like; and then wait for a follow-up operation instruction executed by the user according to the prompt information. Therefore, the embodiments of the present invention implement that whether text information involves sensitive information is automatically detected upon receipt of the text information, and if the sensitive information is involved, a user is prompted that the text information includes the sensitive information, thereby enabling the text information to be replied securely and improving security of a crowdsourcing application.

Figure 1:
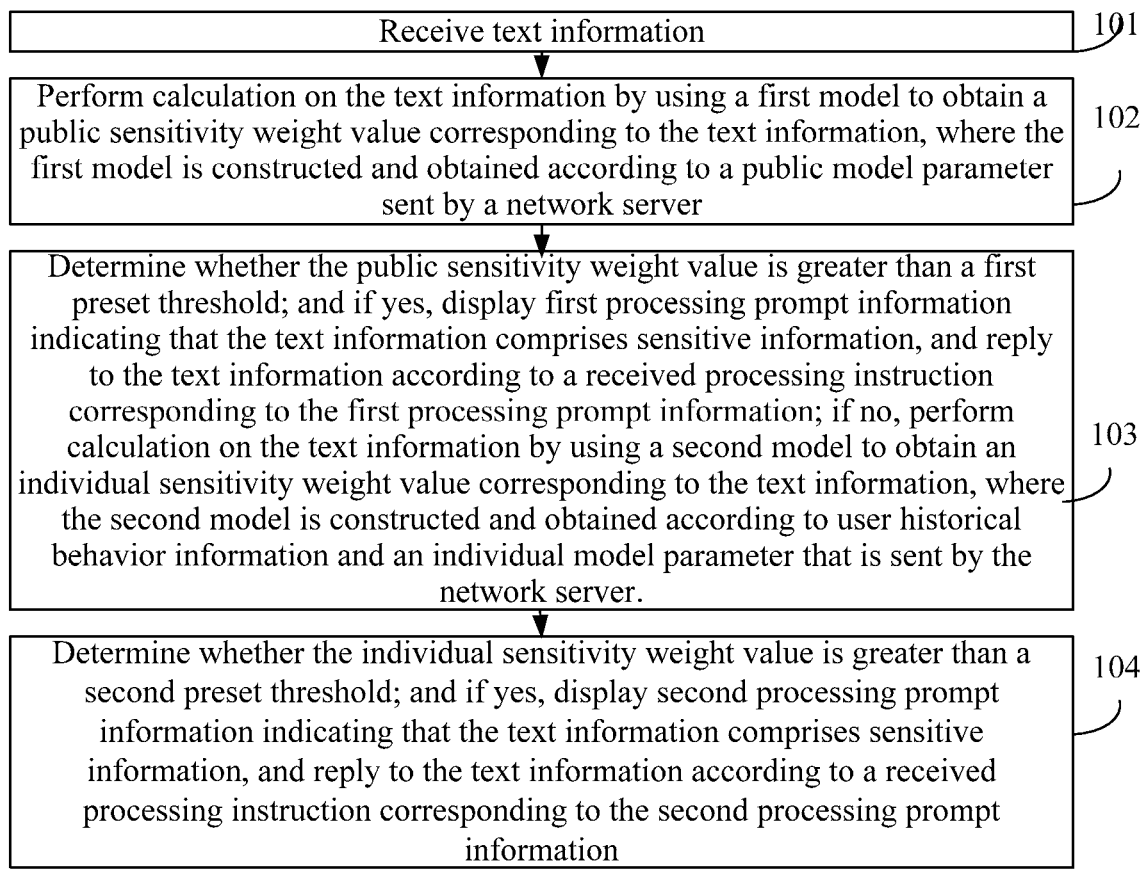
FIG. 1 is a flowchart of an information processing method according to an embodiment of the present invention.

FIG. 1 is a flowchart of an information processing method according to an embodiment of the present invention, where an executing entity of the embodiment is a terminal and a process in which the terminal replies to text information when receiving social media-type text information is described in detail. As shown in FIG. 1, the embodiment includes the following steps:

Step 101: Receive text information.

The received text information may be SMS message text information sent by a network side by using an SMS message channel or a radio data network, or WeChat text information or microblog text information sent by using a network.

Step 102: Perform calculation on the text information by using a first model to obtain a public sensitivity weight value corresponding to the text information, where the first model is constructed and obtained according to a public model parameter sent by a network server.

In order to implement the technical solutions of the present invention, in an actual application, a terminal provides one first model, where the first model is constructed and obtained according to the public model parameter sent by a network server side, and a network parameter of the first model may include a publicly sensitive word and a corresponding sensitivity weight. Specifically, in the actual application, there are usually some common sensitive words, such as words like "transfer of account" and "bank account". These common sensitive words may be referred to as publicly sensitive words. For the publicly sensitive words, in order to distinguish sensitivity degree of each word, a sensitivity weight may be set for each word. For example, a sensitivity weight corresponding to "bank account" is 1, a weight of "QQ account" is 0.7, and the like. The publicly sensitive words and sensitivity weights thereof may be set by the network server according to sensitive words and sensitivity degree thereof in the actual application.

The network server may periodically update the publicly sensitive word and send the sensitive word and sensitivity weight thereof to the terminal, thereby implementing synchronization of the sensitive word between the network side and the terminal side.

The performing calculation on the text information by using a first model to obtain a public sensitivity weight value corresponding to the text information specifically includes: calculating a sensitivity weight corresponding to content of the text information and a sensitivity weight corresponding to a source of the text information by using the first model, where the sensitivity weight corresponding to the content of the text information is calculated and obtained according to a sensitivity weight corresponding to a publicly sensitive word in the text information; and calculating the public sensitivity weight value corresponding to the text information according to the sensitivity weight corresponding to the content of the text information and the sensitivity weight corresponding to the source of the text information which are calculated by using the first model.

Specifically, the first model may be used to perform analysis and calculation on content and a source of the received text information. Because the first model is trained and obtained according to the public model parameter sent by the network server, the first model may be preset with a related publicly sensitive word and a corresponding sensitivity weight, and may also be preset with a sensitive source and a sensitivity weight corresponding thereto. When the text information is received, the first model in the terminal may be used to calculate a public sensitivity weight value corresponding to the text information according to input text information and a source thereof. The text information source set in the first model and a corresponding weight may include some public sources, such as a sensitivity weight corresponding to a source like 10086, 95588, 95533, or the like. For example, text information sent from 10086 generally has low sensitivity, hence a sensitivity the source 10086 may be set with a low sensitivity weight; 95588 involves bank account information of a user, hence, the source 95588 may be set with a high sensitivity weight.

Optionally, the text information may include multiple publicly sensitive words, where each publicly sensitive word may has a corresponding sensitivity weight. The first model may be used to obtain a sensitivity weight corresponding to the text information by performing corresponding calculation on the sensitivity weight corresponding to each publicly sensitive word in the text information.

Step 103: Determine whether the public sensitivity weight value is greater than a first preset threshold; and if yes, display first processing prompt information indicating that the text information includes sensitive information, and reply to the text information according to a received processing instruction corresponding to the first processing prompt information; if no, perform calculation on the text information by using a second model to obtain an individual sensitivity weight value corresponding to the text information, where the second model is constructed and obtained according to user history behavior information and an individual model parameter that is sent by the network server.

The terminal may, after calculating the public sensitivity weight value of the text information by using the first model, determine whether the public sensitivity weight value is greater than the preset first preset threshold, and if the sensitivity weight corresponding to the text information exceeds the first preset threshold, may determine that the text information involves sensitive network information, where the first preset threshold may be set by the terminal itself, or be sent by the network side, and the embodiment of the present invention does not provide a detailed setting.

If it is determined that the public sensitivity weight value is greater than the first preset threshold, the terminal may, when displaying the text information on a client interface, further display processing prompt information including a reply operation that a user can perform on the text information. For example, if the text information involves the sensitive network information, the user may be prompted that only individual reply processing is allowed for the text information, and no crowdsourcing reply processing can be performed. A "crowdsourcing reply" button may not be displayed or the "crowdsourcing reply" button is grayed (that is, no operation may be performed on the button) so that the user can only perform crowdsourcing reply processing. Alternatively, the user may be prompted that an optimal reply manner is individual reply instead of crowdsourcing reply, where an "individual reply" button may be highlighted or the "individual reply" button may be selected by default to prompt the user that the optimal reply manner is the individual reply. Alternatively, prompt information such as "The text information includes sensitive information" may be displayed when the user clicks the "crowdsourcing reply" button, thereby prompting the user that the optimal reply processing manner is the individual reply.

Optionally, the terminal may further display different processing prompt information according to a sensitivity weight value of the text information. For example, if the sensitivity weight value of the text information is 1 or is greater than a set threshold, it may be determined that the text information is very sensitive; therefore, the "crowdsourcing reply" button may not be displayed or the "crowdsourcing reply" button may be grayed to prompt the user that only an operation of individually replying to the text information. When the sensitivity weight corresponding to the text information is smaller than a set threshold but greater than a first sensitivity threshold, the "individual reply" button may be highlighted or the "individual reply" button may be selected by default to prompt the user that the optimal reply manner is the individual reply; however, in such a case, an operation may still be performed on the "crowdsourcing reply" button, and the user still can perform crowdsourcing reply to the text information.

If the public sensitivity weight value is not greater than the first preset threshold, the second model may be used to perform calculation on the text information, thereby determining whether the text information involves individually sensitive information. The performing calculation on the text information by using a second model to obtain a individual sensitivity weight value corresponding to the text information specifically includes: calculating a sensitivity weight corresponding to content of the text information and a sensitivity weight corresponding to a source of the text information by using the second model, where the sensitivity weight corresponding to the content of the text information is calculated and obtained according to the sensitivity weight corresponding to the individually sensitive word in the text information; and calculating the individual sensitivity weight value corresponding to the text information according to the sensitivity weight corresponding to the content of the text information and the sensitivity weight corresponding to the source of the text information which are calculated by using the second model.

In order to implement the technical solutions of the present invention, in an actual application, the terminal provides one second model, where the second model may be obtained by using the following steps: collecting the user history behavior information; and analyzing and training the user history behavior information, and obtaining an individually sensitive word and a sensitivity weight corresponding to the individually sensitive word according to a training result, so as to obtain the second model. Specifically, the user history behavior information includes one or more types of content of history text information, a source of the history text information, content of history reply text information, a time difference between performing an operation of receiving the history text information and performing an operation of replying to the history text information, and a content input rate of the history reply text information.

Specifically, besides the common publicly sensitive words, there is usually an individually sensitive word corresponding to each individual user. For example, a user may be sensitive to some fields because of personal experience. For example, if an industry in which the user engages is a secrecy industry, work-related text information involves sensitive information of the user. Accordingly, the user selects individual reply processing each time receiving text information related to work of the user. The terminal may determine, by performing collection, analysis, and training on content of text information received each time, text content of a reply, a reply manner, and the like of the user, which content is an individually sensitive word of the user and a sensitivity weight corresponding to the sensitive word according to a training result. For example, if each time a user receives text information related to an industry, the user replies to the text information by using individual reply, where content of reply text information is like "talk when I get home" or "talk in person", it may be determined that the information related to the industry involves an individually sensitive word of the user and the sensitivity weight is high.

The source of the history text information in the user history behavior information is a sender of the history text information; the time difference between performing the operation of receiving the history text information and performing the operation of replying to the history text information is a time difference between reading the text information by the user and starting to perform the reply operation; and the content input rate of the history reply text information is a rate at which the user inputs the text information. Optionally, the user history behavior information may also include whether the user replies to the received text information by using a stored SMS message.

The foregoing describes that the individually sensitive word of a user and the sensitivity weight thereof are obtained by analyzing history behavior information of the user. In addition to obtaining the individually sensitive word by using the user history behavior information, the terminal may obtain an individually sensitive word and a sensitivity weight corresponding thereto according to the individual model parameter obtained from the network side. Specifically, when some new words appears, such as "Jiong", the network server may send a sensitivity weight corresponding to the word to the terminal, and the terminal may update an individually sensitive word database according to the sensitivity weight, sent by the network server, of the word.

The second model in the terminal may also be used to set a sensitivity weight corresponding to the source of the text information according to a source of the user history behavior information. A difference from the sensitivity weight corresponding to the source corresponding to the first model lies in that, the first model is used to set a sensitivity weight corresponding to a public source, and the second model is used to set a sensitivity weight corresponding to a source according to the source of the user history behavior information. For example, a sensitivity weight corresponding to a contact who communicates most frequently with the user may be set to be high because the contact who communicates most frequently with the user generally is an intimate friend of the user, and content of text information of these sources is generally more private.

Step 104: Determine whether the individual sensitivity weight value is greater than a second preset threshold; and if yes, display second processing prompt information indicating that the text information includes sensitive information, and reply to the text information according to a received processing instruction corresponding to the second processing prompt information.

Specifically, when the terminal calculates the individual sensitivity weight value by using the second model, the terminal may proceed to determine whether the individual sensitivity weight value is greater than the second preset threshold; and if yes, when displaying the text information on the client interface, may further display processing prompt information indicating a reply operation that the user may perform on the text information. For example, if the text information involves the individually sensitive information, the user may be prompted that only individual reply processing is allowed for the text information, and no crowdsourcing reply processing can be performed. A "crowdsourcing reply" button may not be displayed or the "crowdsourcing reply" button is grayed (that is, no operation may be performed on the button) so that the user can only perform crowdsourcing reply processing. Alternatively, the user may be prompted that an optimal reply manner is individual reply instead of crowdsourcing reply, where an "individual reply" button may be highlighted or the "individual reply" button may be selected by default to prompt the user that the optimal reply manner is the individual reply. Alternatively, prompt information such as "The text information includes sensitive information" may be displayed when the user clicks the "crowdsourcing reply"

button, thereby prompting the user that the optimal reply processing manner is the individual reply.

The second processing prompt information may be the same as or different from the first processing prompt information, where the embodiment of the present invention sets no limit thereto.

It should be noted that even if the terminal determines that the individual sensitivity weight value of the text information is greater than the second preset threshold and displays the second processing prompt information indicating that the text information includes the sensitive information, the user still can perform crowdsourcing reply to the text information.

After replying to the text information including second sensitive information, the terminal may further collect the text information and corresponding reply text information, perform training by using the text information and the corresponding reply text information as training data, and update the second model according to a training result. This may implement that the terminal dynamically updates the second model according to behavior information of the user. That is, when individually sensitive information of the user changes, the terminal can update the second model in real time, thereby performing correct reply processing.

It should be noted that if the individual sensitivity weight value is not greater than the second preset threshold, third processing prompt information indicating that the text information includes no sensitive information may be displayed, and the user may select a suitable reply processing manner according to the third processing prompt information. Therefore, the terminal can reply to the received text information according to the selection of the user.

In the embodiment of the present invention, a terminal may, after receiving text information, first determine whether the text information involves publicly sensitive information by using a first model; if yes, display first processing prompt information to prompt a user to reply accordingly; if no, proceed to determine whether the text information involves individually sensitive information by using a second model, and if yes, display second processing prompt information to prompt the user to reply accordingly. Because the first model is constructed and obtained according to a public sensitivity parameter sent by a network server, and when the network server periodically updates the public sensitivity parameter, the first model may also be automatically updated, and the first model may detect a latest publicly sensitive word and perform secure reply processing, thereby improving security of a crowdsourcing application. The second model is constructed and obtained according to user history behavior information and an individual sensitivity parameter sent by the network server; when the user history behavior information changes, individually sensitive information trained and obtained by the terminal also changes. That is, the second model may be updated in real time, and the terminal may also perform correct reply processing, thereby improving security of the crowdsourcing application.

Figure 2:
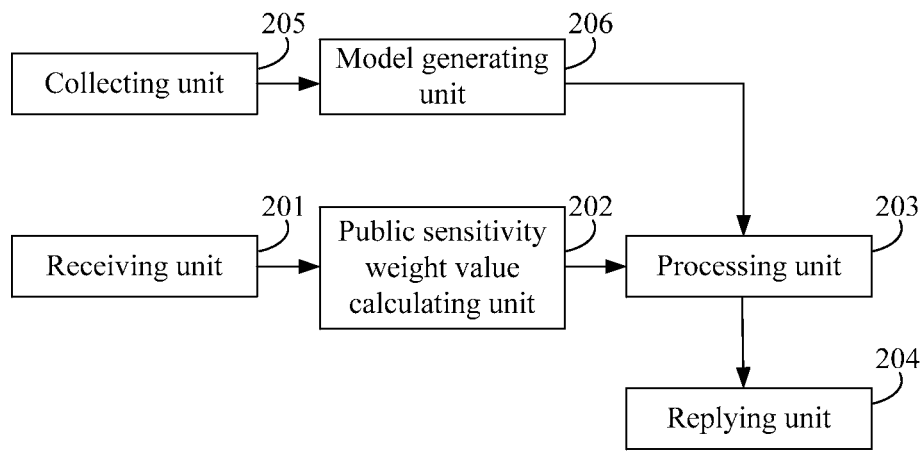
FIG. 2 is a schematic diagram of an information processing apparatus according to an embodiment of the present invention.

Correspondingly, an embodiment of the present invention further provides an information processing apparatus. FIG. 2 is a schematic diagram of the information processing apparatus according to the embodiment of the present invention. As shown in FIG. 2, the apparatus according to the embodiment includes the following units, a receiving unit 201, a public sensitivity weight value calculating unit 202, a processing unit 203, and a replying unit 204:

The receiving unit 201 is configured to receive text information, and transmit the text information to a public sensitivity weight value calculating unit.

The received text information may be SMS message text information sent by a network side by using an SMS message channel or a radio data network, or WeChat text information or microblog text information sent by using a network.

The public sensitivity weight value calculating unit 202 is configured to receive the text information transmitted by the receiving unit; perform calculation on the text information by using a first model to obtain a public sensitivity weight value corresponding to the text information, where the first model is constructed and obtained according to a public model parameter sent by a network server; and transmit the public sensitivity weight value to a processing unit.

The public sensitivity weight value calculating unit 202 is specifically configured to calculate a sensitivity weight corresponding to content of the text information and a sensitivity weight corresponding to a source of the text information by using the first model, where the sensitivity weight corresponding to the content of the text information is calculated and obtained according to a sensitivity weight corresponding to a publicly sensitive word in the text information; and calculate the public sensitivity weight value corresponding to the text information according to the sensitivity weight corresponding to the content of the text information and the sensitivity weight corresponding to the source of the text information which are calculated by using the first model.

In order to implement the technical solutions of the present invention, in an actual application, a terminal provides one first model, where the model is constructed and obtained according to the model parameter sent by a network server side, and a network parameter of the first model may include a publicly sensitive word and a corresponding sensitivity weight.

The network server may periodically update the publicly sensitive word and send the sensitive word and sensitivity weight thereof to the terminal, thereby implementing synchronization of the sensitive word between the network side and the terminal side.

The processing unit 203 is configured to receive the public sensitivity weight value transmitted by the public sensitivity weight value calculating unit; determine whether the public sensitivity weight value is greater than a first preset threshold; and if yes, display first processing prompt information indicating that the text information includes sensitive information, and reply to the text information according to a received processing instruction corresponding to the first processing prompt information; and if no, perform calculation on the text information by using a second model to obtain an individual sensitivity weight value corresponding to the text information, where the second model is constructed and obtained according to user history behavior information and a individual model parameter that is sent by the network server, and transmit the individual sensitivity weight value to a replying unit.

The user history behavior information includes one or a combination of any of the following items: content of history text information, a source of the history text information, content of history reply text information, a time difference between performing an operation of receiving the history text information and performing an operation of replying to the history text information, and a content input rate of the history reply text information.

The terminal may, after calculating the public sensitivity weight value of the text information by using the first model, determine whether the public sensitivity weight value is greater than the preset first preset threshold, and if the sensitivity weight corresponding to the text information exceeds the first preset threshold, may determine that the text information involves sensitive network information, where the first preset threshold may be set by the terminal itself, or be sent by the network side, and the embodiment of the present invention does not provide a detailed setting.

If it is determined that the public sensitivity weight value is greater than the first preset threshold, the terminal may, when displaying the text information on a client interface, further display processing prompt information including a reply operation that a user can perform on the text information. For example, if the text information involves the sensitive network information, the user may be prompted that only individual reply processing is allowed for the text information, and no crowdsourcing reply processing can be performed. A "crowdsourcing reply" button may not be displayed or the "crowdsourcing reply" button is grayed (that is, no operation may be performed on the button) so that the user can only perform crowdsourcing reply processing. Alternatively, the user may be prompted that an optimal reply manner is individual reply instead of crowdsourcing reply, where an "individual reply" button may be highlighted or the "individual reply" button may be selected by default to prompt the user that the optimal reply manner is the individual reply. Alternatively, prompt information such as "The text information includes sensitive information" may be displayed when the user clicks the "crowdsourcing reply" button, thereby prompting the user that the optimal reply processing manner is the individual reply.

Optionally, the terminal may further display different processing prompt information according to a sensitivity weight value of the text information. For example, if the sensitivity weight value of the text information is 1 or is greater than a set threshold, it may be determined that the text information is very sensitive; therefore, the "crowdsourcing reply" button may not be displayed or the "crowdsourcing reply" button may be grayed to prompt the user that only an operation of individual reply processing may be performed on the user. When the sensitivity weight corresponding to the text information is smaller than a set threshold but greater than a first sensitivity threshold, the "individual reply" button may be highlighted or the "individual reply" button may be selected by default to prompt the user that the optimal reply manner is the individual reply; however, in such a case, an operation may still be performed on the "crowdsourcing reply" button, and the user still can perform crowdsourcing reply to the text information.

If the public sensitivity weight value is not greater than the first preset threshold, the second model may be used to perform calculation on the text information, thereby determining whether the text information involves individually sensitive information. The processing unit 203 is specifically configured to calculate a sensitivity weight corresponding to content of the text information and a sensitivity weight corresponding to a source of the text information by using the second model, where the sensitivity weight corresponding to the content of the text information is calculated and obtained according to the sensitivity weight corresponding to the individually sensitive word in the text information; and calculate the individual sensitivity weight value corresponding to the text information according to the sensitivity weight corresponding to the content of the text information and the sensitivity weight corresponding to the source of the text information which are calculated by using the second model.

Certainly, in addition to obtaining the sensitivity weight corresponding to the individually sensitive word and the sensitivity weight corresponding to the text information by analyzing the user history behavior information, the terminal may also obtain a sensitive word of a field from a network side according to a field to which the sensitive information of the user belongs. For example, if a user is sensitive to information in an accounting field, a sensitive word in the accounting field and a corresponding sensitivity weight may be obtained on a network.

The replying unit 204 is configured to receive the individual sensitivity weight value transmitted by the processing unit; determine whether the individual sensitivity weight value is greater than a second preset threshold; and if yes, display second processing prompt information indicating that the text information includes sensitive information, and reply to the text information according to a received processing instruction corresponding to the second processing prompt information.

Specifically, when the terminal calculates the individual sensitivity weight value by using the second model, the terminal may proceed to determine whether the individual sensitivity weight value is greater than the second preset threshold; and if yes, when displaying the text information on the client interface, may further display processing prompt information indicating a reply operation that the user may perform on the text information. For example, if the text information involves the sensitive network information, the user may be prompted that only individual reply processing is allowed for the text information, and no crowdsourcing reply processing can be performed. A "crowdsourcing reply" button may not be displayed or the "crowdsourcing reply" button is grayed (that is, no operation may be performed on the button) so that the user can only perform crowdsourcing reply processing. Alternatively, the user may be prompted that an optimal reply manner is individual reply instead of crowdsourcing reply, where an "individual reply" button may be highlighted or the "individual reply" button may be selected by default to prompt the user that the optimal reply manner is the individual reply. Alternatively, prompt information such as "The text information includes sensitive information" may be displayed when the user clicks the "crowdsourcing reply" button, thereby prompting the user that the optimal reply processing manner is the individual reply.

The second processing prompt information may be the same as or different from the first processing prompt information, where the embodiment of the present invention sets no limit thereto.

It should be noted that even if the terminal determines that the individual sensitivity weight value of the text information is greater than the second preset threshold and displays the second processing prompt information indicating that the text information includes the sensitive information, the user still can perform crowdsourcing reply to the text information.

The replying unit 204 is further configured to: if the individual sensitivity weight value is not greater than the second preset threshold, display third processing prompt information indicating that the text information includes no sensitive information, and reply to the text information according to a received processing instruction corresponding to the third processing prompt information.

In order to implement the technical solutions of the present invention, in an actual application, the terminal provides one second model. Preferably, the apparatus provided by the embodiment of the present invention further includes a collecting unit 205 and a model generating unit 206. The collecting unit 205 is configured to collect the user history behavior information, and transmit the user history behavior information to the model generating unit; and the model generating unit 206 is configured to receive the user history behavior information transmitted by the collecting unit, analyze and train the user history behavior information, and obtain an individually sensitive word and a sensitivity weight corresponding to the individually sensitive word according to a training result, so as to obtain the second model.

Therefore, an apparatus provided by the embodiment of the present invention may, after receiving text information, first determine whether the text information involves publicly sensitive information by using a first model; if yes, display first processing prompt information to prompt a user to reply accordingly; if no, proceed to determine whether the text information involves individually sensitive information by using a second model, and if yes, display second processing prompt information to prompt the user to reply accordingly. Because the first model is constructed and obtained according to a public sensitivity parameter sent by a network server, and when the network server periodically updates the public sensitivity parameter, the first model may also be automatically updated, and the first model may detect a latest publicly sensitive word and perform secure reply processing, thereby improving security of a crowdsourcing application. The second model is constructed and obtained according to user history behavior information and an individual sensitivity parameter sent by the network server; when the user history behavior information changes, individually sensitive information trained and obtained by the terminal also changes. That is, the second model may be updated in real time, and the terminal may also perform correct reply processing, thereby improving security of the crowdsourcing application.

Figure 3:
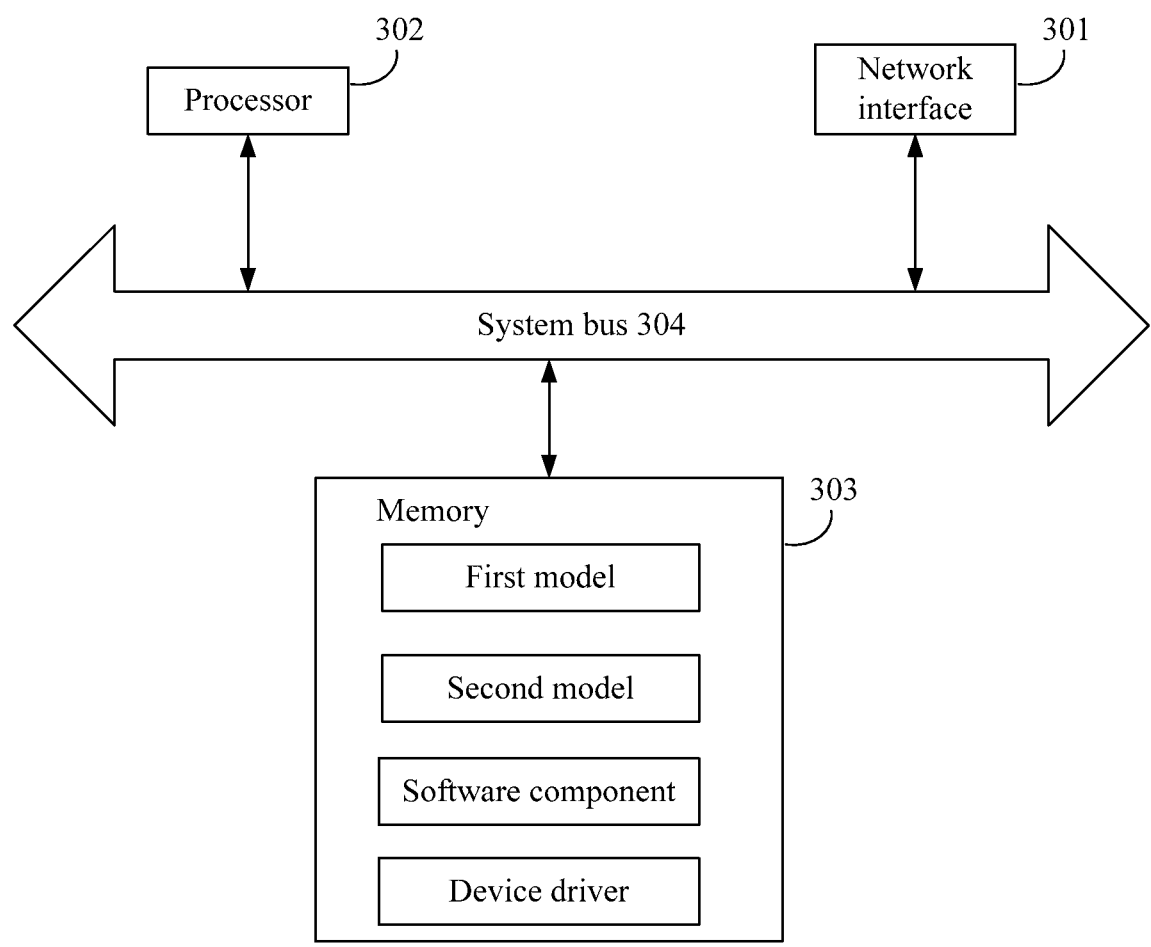
FIG. 3 is a schematic diagram of a terminal according to an embodiment of the present invention.

Correspondingly, an embodiment of the present invention further provides a terminal. FIG. 3 is a schematic diagram of a terminal according to the embodiment of the present invention. As shown in FIG. 3, the embodiment includes a network interface 301, a processor 302, and a memory 303. A system bus 304 is configured to connect the network interface 301, the processor 302, and the memory 303.

The network interface 301 is configured to communicate with another terminal or a network server.

The memory 303 may be a permanent memory, for example, a hard drive and a flash memory, where the memory 303 has a first model, a second model, a software module, and a device driver. The software module can execute the various functional modules of the foregoing method of the present invention. The device driver may be a network and interface driver.

Upon startup, a software component is loaded into the memory 303 and then is accessed by the processor 302 in performing the following instructions:

receiving text information;

performing calculation on the text information by using a first model to obtain a public sensitivity weight value corresponding to the text information, where the first model is constructed and obtained according to a public model parameter sent by a network server;

determining whether the public sensitivity weight value is greater than a first preset threshold; and if yes, displaying first processing prompt information indicating that the text information includes sensitive information, and replying to the text information according to a received processing instruction corresponding to the first processing prompt information; if no, performing calculation on the text information by using a second model to obtain an individual sensitivity weight value corresponding to the text information, where the second model is constructed and obtained according to user history behavior information and an individual model parameter that is sent by the network server; and determining whether the individual sensitivity weight value is greater than a second preset threshold; and if yes, displaying second processing prompt information indicating that the text information includes sensitive information, and replying to the text information according to a received processing instruction corresponding to the second processing prompt information.

Specifically, in order to implement the technical solutions of the present invention, the terminal provides the first model and the second model. The first model is constructed and obtained according to a public model parameter sent by a network server side, and a network parameter of the first model may include a publicly sensitive word and a corresponding sensitivity weight. Specifically, the first model may be used to perform analysis and calculation on the received text information and a source. Because the first model is trained and obtained according the public model parameter sent by the network server, the first model may be preset with a related publicly sensitive word and a corresponding sensitivity weight, and may also be preset with a sensitive source and a corresponding sensitivity weight. When the text information is received, the first model in the terminal may calculate a public sensitivity weight value corresponding to the text information according to input text information and a source thereof. The second model may be obtained according to user history behavior information and an individual network parameter sent by the network server. Specifically, the user history behavior information includes one or a combination of any of the following items: content of history text information, a source of the history text information, content of history reply text information, a time difference between performing an operation of receiving the history text information and performing an operation of replying to the history text information, and a content input rate of the history reply text information.

The source of the history text information in the user history behavior information is a sender of the history text information; the time difference between performing the operation of receiving the history text information and performing the operation of replying to the history text information is a time difference between reading the text information by the user and starting to perform the reply operation; and the content input rate of the history reply text information is a rate at which the user inputs the text information. Optionally, the user history behavior information may also include whether the user replies to the received text information by using a stored SMS message.

The terminal may, when determining that the text information includes the sensitive information, display processing prompt information indicating a reply operation that the user may perform on the text information while displaying the text information, so as to instruct the user that only crowdsourcing reply processing can be performed or to prompt the user that an optimal reply processing manner is individual reply.

Further, the processor 302 accesses the software component in the memory 303 after determining whether the individual sensitivity weight value is greater than the second preset threshold, so as to execute an instruction for the following process: if the individual sensitivity weight value is not greater than the second preset threshold, displaying third processing prompt information indicating that the text information includes no sensitive information, and replying to the text information according to a received processing instruction corresponding to the third processing prompt information.

Further, the instruction for the processor 302 to access the software component in the memory 303 and perform the process of performing calculation on the text information by using the first model to obtain the public sensitivity weight value corresponding to the text information is: calculating a sensitivity weight corresponding to content of the text information and a sensitivity weight corresponding to a source of the text information by using the first model, where the sensitivity weight corresponding to the content of the text information is calculated and obtained according to a sensitivity weight corresponding to a publicly sensitive word in the text information; and calculating the public sensitivity weight value corresponding to the text information according to the sensitivity weight corresponding to the content of the text information and the sensitivity weight corresponding to the source of the text information which are calculated by using the first model.

Further, the user history behavior information includes content of history text information, a source of the history text information, content of history reply text information, a time difference between performing an operation of receiving the history text information and performing an operation of replying to the history text information, and a content input rate of the history reply text information. The processor 302 accesses the software component in the memory 303 to execute an instruction for the following process to generate the second model: collecting the user history behavior information; and analyzing and training the user history behavior information, and obtaining an individually sensitive word and a sensitivity weight corresponding to the individually sensitive word according to a training result and the individual model parameter that is sent by the network server, so as to obtain the second model.

Further, the instruction for the processor 302 to access the software component in the memory 302 and perform the process of performing calculation on the text information by using the second model to obtain the individual sensitivity weight value corresponding to the text information is: calculating a sensitivity weight corresponding to content of the text information and a sensitivity weight corresponding to a source of the text information by using the second model, where the sensitivity weight corresponding to the content of the text information is calculated and obtained according to the sensitivity weight corresponding to the individually sensitive word in the text information; and calculating the individual sensitivity weight value corresponding to the text information according to the sensitivity weight corresponding to the content of the text information and the sensitivity weight corresponding to the source of the text information which are calculated by using the second model.

Therefore, the embodiment of the present invention enables a terminal to automatically detect, when receiving text information, whether the text information includes sensitive information, and if the sensitive information is included, prompts a user that the text information includes the sensitive information, so that the user replies securely to the text information, thereby improving security of a crowdsourcing application.

An embodiment of the present invention further provides an information processing system. The system can use the information processing method according to the embodiment of the present invention, and includes the terminal and the network server, where the network server is a network server supporting the technical solution implemented by the apparatus provided by the foregoing corresponding embodiment. In the system, the network server transmits a public model parameter and an individual model parameter to the terminal; the terminal constructs and obtains a first model according to the received public model parameter, and constructs and obtains a second model according to the individual model parameter and user history behavior information; and the terminal performs the following operations after receiving text information: performing calculation on the text information by using the first model to obtain a public sensitivity weight value corresponding to the text information; determining whether the public sensitivity weight value is greater than a first preset threshold; and if yes, displaying first processing prompt information indicating that the text information includes sensitive information, and replying to the text information according to a received processing instruction corresponding to the first processing prompt information; if no, performing calculation on the text information by using the second model to obtain an individual sensitivity weight value corresponding to the text information; and determining whether the individual sensitivity weight value is greater than a second preset threshold; and if yes, displaying second processing prompt information indicating that the text information includes sensitive information, and replying to the text information according to a received processing instruction corresponding to the second processing prompt information.

Optionally, in the system, the terminal, after performing an operation of determining whether the individual sensitivity weight value is greater than the second preset threshold, if it is determined that the individual sensitivity weight value is not greater than the second preset threshold, displays third processing prompt information indicating that the text information includes no sensitive information, and replies to the text information according to a received processing instruction corresponding to the third processing prompt information.

Specifically, a process in which the terminal performs calculation on the text information by using the first model to obtain the public sensitivity weight value corresponding to the text information is specifically as follows: calculating a sensitivity weight corresponding to content of the text information and a sensitivity weight corresponding to a source of the text information by using the first model, where the sensitivity weight corresponding to the content of the text information is calculated and obtained according to a sensitivity weight corresponding to a publicly sensitive word in the text information; and calculating the public sensitivity weight value corresponding to the text information according to the sensitivity weight corresponding to the content of the text information and the sensitivity weight corresponding to the source of the text information which are calculated by using the first model.

Preferably, a process in which the terminal performs calculation on the text information by using the second model to obtain the individual sensitivity weight value corresponding to the text information is specifically as follows: calculating a sensitivity weight corresponding to content of the text information and a sensitivity weight corresponding to a source of the text information by using the second model, where the sensitivity weight corresponding to the content of the text information is calculated and obtained according to the sensitivity weight corresponding to the individually sensitive word in the text information; and calculating the individual sensitivity weight value corresponding to the text information according to the sensitivity weight corresponding to the content of the text information and the sensitivity weight corresponding to the source of the text information which are calculated by using the second model.

The user history behavior information includes one or a combination of any of the following items: content of history text information, a source of the history text information, content of history reply text information, a time difference between performing an operation of receiving the history text information and performing an operation of replying to the history text information, and a content input rate of the history reply text information.

A process in which the terminal constructs and obtains the second model according to the individual model parameter and the user history behavior information is specifically as follows: collecting the user history behavior information; and analyzing and training the user history behavior information, and obtaining an individually sensitive word and a sensitivity weight corresponding to the individually sensitive word according to a training result and the individual model parameter that is sent by the network server, so as to obtain the second model.

Therefore, in the system, a terminal may, after receiving text information, first determine whether the text information involves publicly sensitive information by using a first model; if yes, display first processing prompt information to prompt a user to reply accordingly; if no, proceed to determine whether the text information involves individually sensitive information by using a second model, and if yes, display second processing prompt information to prompt the user to reply accordingly. Because the first model is constructed and obtained according to a public sensitivity parameter sent by a network server, and when the network server periodically updates the public sensitivity parameter, the first model may also be automatically updated, and the first model may detect a latest publicly sensitive word and perform secure reply processing, thereby improving security of a crowdsourcing application. The second model is constructed and obtained according to user history behavior information and an individual sensitivity parameter sent by the network server; when the user history behavior information changes, individually sensitive information trained and obtained by the terminal also changes. That is, the second model may be updated in real time, and the terminal may also perform correct reply processing, thereby improving security of the crowdsourcing application.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

With reference to the embodiments disclosed herein, steps of the method or algorithm described may be implemented using hardware, a software module executed by a processor, or the combination of hardware and a software module executed by a processor. The software module may be placed in a random access memory (RAM), a memory, a read-only memory (ROM), an electrically programmable ROM, and an electrically erasable programmable ROM, a register, a hard disk, a removable magnetic disk, a CD-ROM, or any storage medium of other forms well-known in the art.

The foregoing specific embodiments further describe the objective, technical solutions, and benefits of the present invention in detail. It should be understood that the foregoing are merely specific embodiments of the present invention, and are not intended to limit the protection scope of the present invention. Any modifications, equivalent replacements, and improvements made without departing from the spirit and principle of the present invention shall fall within the scope of the present invention.

What is claimed is:

1. An information processing method, wherein the method comprises:

receiving text information;

performing a calculation on the text information using a first model to obtain a public sensitivity weight value corresponding to the text information, wherein the first model is constructed and obtained according to a public model parameter sent by a network server;

determining whether the public sensitivity weight value is greater than a first preset threshold; if the public sensitivity weight value is greater than the first preset threshold, displaying first processing prompt information indicating that the text information comprises sensitive information, and replying to the text information according to a received processing instruction corresponding to the first processing prompt information;

if the public sensitivity weight value is not greater than the first preset threshold, performing a calculation on the text information using a second model to obtain an individual sensitivity weight value corresponding to the text information, wherein the second model is constructed and obtained according to user history behavior information and an individual model parameter that is sent by the network server; and determining whether the individual sensitivity weight value is greater than a second preset threshold; if the individual sensitivity weight value is greater than the second preset threshold, displaying second processing prompt information indicating that the text information comprises sensitive information, and replying to the text information according to a received processing instruction corresponding to the second processing prompt information.

2. The information processing method according to claim 1, wherein after the determining whether the individual sensitivity weight value is greater than the second preset threshold, the method further comprises: if the individual sensitivity weight value is not greater than the second preset threshold, displaying third processing prompt information indicating that the text information comprises no sensitive information, and replying to the text information according to a received processing instruction corresponding to the third processing prompt information.

3. The information processing method according to claim 1, wherein the performing the calculation on the text information using the first model to obtain the public sensitivity weight value corresponding to the text information further comprises:

calculating a sensitivity weight corresponding to content of the text information and a sensitivity weight corresponding to a source of the text information using the first model, wherein the sensitivity weight corresponding to the content of the text information is calculated and obtained according to the sensitivity weight corresponding to a publicly sensitive word in the text information; and calculating the public sensitivity weight value corresponding to the text information according to the sensitivity weight corresponding to the content of the text information and the sensitivity weight corresponding to the source of the text information both of which are calculated using the first model.

4. The information processing method according to claim 1, wherein the user history behavior information comprises one or a combination of any of the following items: content of history text information, a source of the history text information, content of history reply text information, a time difference between performing an operation of receiving the history text information and performing an operation of replying to the history text information, and a content input rate of the history reply text information; and wherein the second model is further obtained by implementing the following steps:

collecting the user history behavior information; and analyzing and training the user history behavior information, and obtaining an individually sensitive word and a sensitivity weight corresponding to the individually sensitive word according to a training result and the individual model parameter that is sent by the network server, so as to obtain the second model.

5. The information processing method according to claim 4, wherein the performing the calculation on the text information using the second model to obtain the individual sensitivity weight value corresponding to the text information further comprises:

calculating a sensitivity weight corresponding to content of the text information and a sensitivity weight corresponding to a source of the text information using the second model, wherein the sensitivity weight corresponding to the content of the text information is calculated and obtained according to the sensitivity weight corresponding to the individually sensitive word in the text information; and calculating the individual sensitivity weight value corresponding to the text information according to the sensitivity weight corresponding to the content of the text information and the sensitivity weight corresponding to the source of the text information both of which are calculated using the second model.

6. An information processing apparatus, wherein the apparatus comprises a processor and a processor-readable medium having processor-executable instructions stored thereon, the processor-executable instructions including a plurality of units, the units including:

a receiving unit, configured to receive text information, and transmit the text information to a public sensitivity weight value calculating unit;

the public sensitivity weight value calculating unit, configured to receive the text information transmitted by the receiving unit; perform a calculation on the text information using a first model to obtain a public sensitivity weight value corresponding to the text information, wherein the first model is constructed and obtained according to a public model parameter sent by a network server; and transmit the public sensitivity weight value to a processing unit;

the processing unit, configured to receive the public sensitivity weight value transmitted by the public sensitivity weight value calculating unit; determine whether the public sensitivity weight value is greater than a first preset threshold; if whether the public sensitivity weight value is greater than the first preset threshold, display first processing prompt information indicating that the text information comprises sensitive information, and reply to the text information according to a received processing instruction corresponding to the first processing prompt information; if whether the public sensitivity weight value is not greater than the first preset threshold, perform a calculation on the text information using a second model to obtain an individual sensitivity weight value corresponding to the text information, wherein the second model is constructed and obtained according to user history behavior information and an individual model parameter that is sent by the network server, and transmit the individual sensitivity weight value to a replying unit; and the replying unit, configured to receive the individual sensitivity weight value transmitted by the processing unit; determine whether the individual sensitivity weight value is greater than a second preset threshold; if the individual sensitivity weight value is greater than the second preset threshold, display second processing prompt information indicating that the text information comprises sensitive information, and reply to the text information according to a received processing instruction corresponding to the second processing prompt information.

7. The information processing apparatus according to claim 6, wherein the replying unit is further configured to: if the individual sensitivity weight value is not greater than the second preset threshold, display third processing prompt information indicating that the text information comprises no sensitive information, and reply to the text information according to a received processing instruction corresponding to the third processing prompt information.

8. The information processing apparatus according to claim 6, wherein the public sensitivity weight value calculating unit is further configured to:

calculate a sensitivity weight corresponding to content of the text information and a sensitivity weight corresponding to a source of the text information using the first model, wherein the sensitivity weight corresponding to the content of the text information is calculated and obtained according to a sensitivity weight corresponding to a publicly sensitive word in the text information; and calculate the public sensitivity weight value corresponding to the text information according to the sensitivity weight corresponding to the content of the text information and the sensitivity weight corresponding to the source of the text information both of which are calculated using the first model.

9. The information processing apparatus according to claim 6, wherein the user history behavior information comprises one or a combination of any of the following items: content of history text information, a source of the history text information, content of history reply text information, a time difference between performing an operation of receiving the history text information and performing an operation of replying to the history text information, and a content input rate of the history reply text information; and the apparatus further comprises a collecting unit and a model generating unit, wherein the collecting unit is configured to collect the user history behavior information, and transmit the user history behavior information to the model generating unit; and the model generating unit is configured to receive the user history behavior information transmitted by the collecting unit, analyze and train the user history behavior information, and obtain an individually sensitive word and a sensitivity weight corresponding to the individually sensitive word according to a training result and the individual model parameter that is sent by the network server, so as to obtain the second model.

10. The information processing apparatus according to claim 9, wherein the processing unit is further configured to:

calculate a sensitivity weight corresponding to content of the text information and a sensitivity weight corresponding to a source of the text information using the second model, wherein the sensitivity weight corresponding to the content of the text information is calculated and obtained according to the sensitivity weight corresponding to the individually sensitive word in the text information; and calculate the individual sensitivity weight value corresponding to the text information according to the sensitivity weight corresponding to the content of the text information and the sensitivity weight corresponding to the source of the text information both of which are calculated using the second model.

11. An information processing system, comprising a terminal and a network server, wherein:

the network server transmits a public model parameter and an individual model parameter to the terminal;

the terminal constructs and obtains a first model according to the received public model parameter, and constructs and obtains a second model according to the individual model parameter and user history behavior information; and the terminal, after receiving text information, performs the following operations:

performing a calculation on the text information using the first model to obtain a public sensitivity weight value corresponding to the text information;

determining whether the public sensitivity weight value is greater than a first preset threshold; if the public sensitivity weight value is greater than the first preset threshold, displaying first processing prompt information indicating that the text information comprises sensitive information, and replying to the text information according to a received processing instruction corresponding to the first processing prompt information; if the public sensitivity weight value is not greater than the first preset threshold, performing a calculation on the text information using the second model to obtain an individual sensitivity weight value corresponding to the text information; and determining whether the individual sensitivity weight value is greater than a second preset threshold; if the individual sensitivity weight value is greater than the second preset threshold, displaying second processing prompt information indicating that the text information comprises sensitive information, and replying to the text information according to a received processing instruction corresponding to the second processing prompt information.

12. The information processing system according to claim 11, wherein, after performing the operation of determining whether the individual sensitivity weight value is greater than the second preset threshold, if it is determined that the individual sensitivity weight value is not greater than the second preset threshold, the terminal displays third processing prompt information indicating that the text information comprises no sensitive information, and replies to the text information according to a received processing instruction corresponding to the third processing prompt information.

13. The information processing system according to claim 11, wherein the terminal performing the calculation on the text information using the first model to obtain the public sensitivity weight value corresponding to the text information further comprises:

calculating a sensitivity weight corresponding to content of the text information and a sensitivity weight corresponding to a source of the text information using the first model, wherein the sensitivity weight corresponding to the content of the text information is calculated and obtained according to a sensitivity weight corresponding to a publicly sensitive word in the text information; and calculating the public sensitivity weight value corresponding to the text information according to the sensitivity weight corresponding to the content of the text information and the sensitivity weight corresponding to the source of the text information which are calculated by using the first model.

14. The information processing system according to claim 11, wherein the user history behavior information comprises one or a combination of any of the following items: content of history text information, a source of the history text information, content of history reply text information, a time difference between performing an operation of receiving the history text information and performing an operation of replying to the history text information, and a content input rate of the history reply text information; and the terminal constructing and obtaining the second model according to the individual model parameter and the user history behavior information further comprises:

collecting the user history behavior information; and analyzing and training the user history behavior information, and obtaining an individually sensitive word and a sensitivity weight corresponding to the individually sensitive word according to a training result and the individual model parameter that is sent by the network server, so as to obtain the second model.

15. The information processing system according to claim 14, wherein the terminal performing the calculation on the text information using the second model to obtain the individual sensitivity weight value corresponding to the text information further comprises:

calculating a sensitivity weight corresponding to content of the text information and a sensitivity weight corresponding to a source of the text information using the second model, wherein the sensitivity weight corresponding to the content of the text information is calculated and obtained according to the sensitivity weight corresponding to the individually sensitive word in the text information; and calculating the individual sensitivity weight value corresponding to the text information according to the sensitivity weight corresponding to the content of the text information and the sensitivity weight corresponding to the source of the text information both of which are calculated using the second model.

\* \* \* \* \*